United States Patent [19]

Wrenn, Jr. et al.

[11] Patent Number: 4,818,448
[45] Date of Patent: Apr. 4, 1989

[54] METHOD FOR FABRICATING LIGHT WEIGHT CARBON-BONDED CARBON FIBER COMPOSITES

[75] Inventors: George E. Wrenn, Jr., Clinton; Leonard A. Abbatiello; John Lewis, Jr., both of Oak Ridge, all of Tenn.

[73] Assignee: The United States of America as represented by the United States Department of Energy, Washington, D.C.

[21] Appl. No.: 63,059

[22] Filed: Jun. 17, 1987

[51] Int. Cl.$^4$ .................... B29C 41/16; B29C 71/02
[52] U.S. Cl. .................... 264/29.2; 264/29.5; 264/29.6; 264/85; 264/122; 264/234; 264/345; 264/86
[58] Field of Search .............. 264/29.5, 29.1, 101, 264/109, 122, 29.6, 85, 234, 345, 301, 86; 425/84, 85

[56] References Cited

U.S. PATENT DOCUMENTS

| | | | |
|---|---|---|---|
| 3,702,279 | 11/1972 | Ardary et al. | 264/60 |
| 3,793,204 | 2/1974 | Ardary et al. | 252/62 |
| 4,041,116 | 8/1977 | Baud et al. | 264/114 |
| 4,152,482 | 5/1979 | Reynolds et al. | 264/29.5 |
| 4,391,873 | 7/1983 | Brassell et al. | 264/29.1 |
| 4,396,663 | 8/1983 | Mitchell et al. | 264/29.1 |

OTHER PUBLICATIONS

Kirk–Othmer, "Encylopedia of Chem Technology", 3rd ed., vol. 10 (8/80), pp. 284 & 290.

*Primary Examiner*—Jan H. Silbaugh
*Assistant Examiner*—Hubert C. Lorin
*Attorney, Agent, or Firm*—Earl L. Larcher; Stephen D. Hamel; Judson R. Hightower

[57] ABSTRACT

Ultralight carbon-bonded carbon fiber composites of densities in the range of about 0.04 to 0.10 grams per cubic centimeter are fabricated by forming an aqueous slurry of carbonaceous fibers which include carbonized fibers and 0–50 weight percent fugitive fibers and a particulate thermosetting resin precursor. The slurry is brought into contact with a perforated mandrel and the water is drained from the slurry through the perforations at a controlled flow rate of about 0.03 to 0.30 liters per minutes per square inch of mandrel surface. The deposited billet of fibers and resin precursor is heated to cure the resin precursor to bind the fibers together, removed from the mandrel, and then the resin and fugitive fibers, if any, are carbonized.

5 Claims, 1 Drawing Sheet

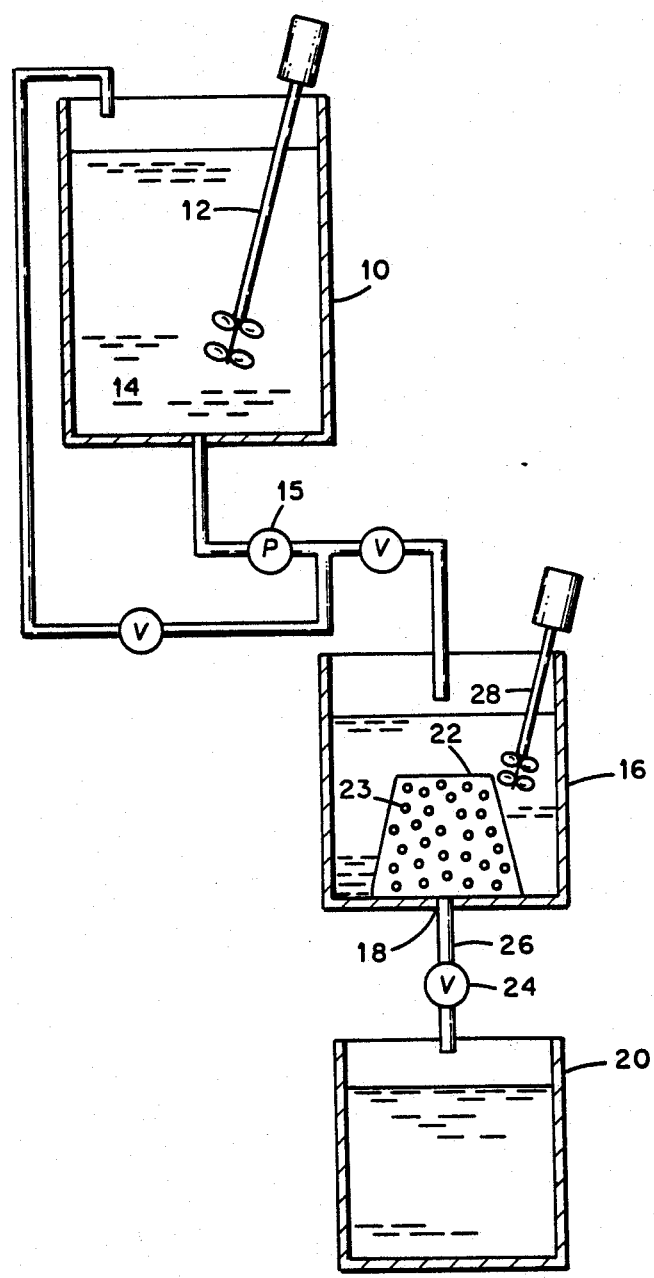

METHOD FOR FABRICATING LIGHT WEIGHT CARBON-BONDED CARBON FIBER COMPOSITES

BACKGROUND OF THE INVENTION

The present invention presents generally to fabrication of carbon-bonded carbon fiber composites, and more particularly to the preparation of such composites with densities of less than about 0.10 gm/cc and a relatively high level of strain tolerance. This invention was made as a result of work under contract, W-7405-eng-26 between Union Carbide Corporation, Nuclear Division, and the U.S. Department of Energy.

Lightweight composites formed of materials such as organic and inorganic fibers, carbon foams and the like provide excellent thermal insulation properties and are particularly suitable for insulating components used in applications such as aircraft, electronics packaging, and the like. Carbon fibers are particularly suitable for the fabrication of the composites due to the interlocking effect provided by the fibers to provide increased strength properties. Exemplary carbon fiber thermal insulation composites are described in assignee's U.S. Pat. No. 3,702,279 which issued Nov. 7, 1972, No. 3,793,204 which issued Feb. 19, 1974, No. 4,152,482 which issued May 1, 1979, and No. 4,391,873 which issued July 5, 1983. Inasmuch as these references disclose the molding of the fibrous composites from aqueous slurries in a vacuum molding fixture which corresponds generally to the molding apparatus and method of the present invention except for the use of vacuum, these references are incorporated herein by reference.

While composites such as described in these patents and other previously known fibrous composites were found to possess satisfactory thermal insulation properties useful for many applications they also possessed a drawback which detracted from their usage in some selected applications having significant weight restrictions such as in aerospace vehicles. The composites as previously known typically have densities in the range of about 0.15 to 0.25 g/cc which if used extensively resulted in payload reductions.

SUMMARY OF THE INVENTION

Accordingly, it is the primary aim or objective of the present invention to provide a method for fabricating a lightweight composite formed of carbon fibers joined together by a carbon bond with densities less than about 0.10 g/cc. Generally, the composite of the present invention is a carbon-bonded carbon fiber composite of the density in the range of about 0.04 to 0.10 g/cc. The method for preparing this composite comprises the steps of forming an aqueous slurry containing about 1000 to 5000 ppm of solids material consisting essentially of carboneous fibers and a carbonizable binder provided by a particulate thermosetting resin precursor. The aqueous slurry containing the carboneous material is brought into contact with the surface of a perforated and configured mandrel to deposit the solid material in the aqueous slurry onto the surface of the mandrel. This deposition of the solid material is provided by draining the water from the aqueous slurry through the perforations in the mandrel at a controlled rate in the range of about 0.03 to about 0.30 liters of water per minute per square inch of surface area on the mandrel contacted by the aqueous slurry. The deposition of the solid material is continued on the mandrel at this rate until a billet of the desired thickness is formed. The molded billet is heated at a sufficient temperature and duration to cure the particulate thermosetting resin and then removed from the mandrel. The billet is thereafter heated in an inert atmosphere to a temperature sufficient to carbonize carbonizable material in the billet to provide the carbon-bonded carbon fiber composite.

Other and further objects of the invention will be obvious upon an understanding of the illustrative composite and method about to be described or will be indicated in the appended claims and various advantages not referred to herein will occur to one skilled in the art upon employment of the invention in practice.

DESCRIPTION OF THE DRAWING

The single FIGURE of the drawing is a schematic representation of apparatus suitable for practicing the method of the present invention for forming light weight fibrous composities.

The apparatus chosen for the purpose of illustration and description is not intended to be exhaustive or to limit the invention to the precise form of apparatus disclosed. The apparatus is chosen and described in order to best explain the principles of the invention and their application and practical use to thereby enable others skilled in the art to best utilize the method of the invention and various modifications thereof as are best adapted to a particular use contemplated.

DETAILED DESCRIPTION OF THE INVENTION

Described generally, the lightweight fibrous composite of the present invention is formed of carbon fibers joined together by a carbonized binder. The preparation of the composite is generally achieved by mixing an aqueous slurry of carbonaceous fibers which includes precarbonized fibers and carbonizable or fugitive fibers and a particulate thermosetting resin precursor. The solids in the aqueous solution are provided by the carbonaceous fibers and the resin precursor with the carbonaceous fibers providing about 50 to 75 weight percent of the solids. The aqueous slurry of the carbon and fugitive fibers along with the resin precurser is subjected to a molding operation wherein the slurry is introduced into a molding tank where it contacts a perforated mandrel of the desired product configuration disposed in the tank. The solid slurry constituents are deposited upon the mandrel to form a product of the desired thickness. The molding process of the present invention can be practiced by utilizing molding apparatus generally corresponding to that employed in assignee's aforementioned U.S. Pat. No. 4,391,873, in that a mixing tank 10 containing suitable stirring means 12 is filled with the aqueous slurry 14 containing the composite constituents which are mixed and then conveyed by pump 15 into the molding tank 16 containing a drain hole 18 in the bottom which extends to a water trap 20. A shaped perforated mandrel 22 in which holes 23 are uniformly positioned about the surface is placed in the molding tank 16 above the drain hole 18. The mandrel 22 is then covered with a filter cloth (not shown) of knitted cotton to assurre more uniform distribution of the water through the mandrel 22 during deposition of the solids material from the slurry.

The aqueous slurry 14, when brought into contact with the mandrel as in the previous applications such as described in assignee's aforementioned patents, was subjected to a vacuum loading which was normally in the range of about 5 to 25 inches of mercury to provide a flow rate of water through the mandrel in a range of about 100 to 200 liters per minute per square inch of mandrel surface. The present invention significantly differs from these previously known vacuum molding techniques in that the water is drained from the slurry molding tank at a relatively slow rate as compared to vacuum molding. A valve 24 is placed in the outlet conduit 26 coupled to the drain hole 18 so that the water is controllably removed from the slurry at a rate of about 0.03 to about 0.30 liters of water per minute per square inch of surface on the mandrel contacted by the aqueous slurry. This very slow rate of water removal from the aqueous mixture by gravity flow allows for the deposition of the solids material on the mandrel to form a relatively low density billet on the mandrel surface with relatively large void fractions between fiber since the fibers are not pulled onto the mandrel by the vacuum loading. To assure that uniform deposition of the solids material is achieved on the surface of the mandrel, the molding tank 16 may be provided with a stirring mechanism 28 similar to that employed in the slurry forming tank 10 to agitate and maintain the homogeneity of the slurry within the molding tank 16.

The carbon fibers utilized in the present invention may be readily formed from rayon fibers of a length of about 800 micrometers before carbonizing. Carbonizing these rayon fibers maybe achieved by heating them in an inert atmosphere to a temperature of about 1000° C. to 1200° C. to provide the carbon fibers of a length of about 500 micrometers. The fugitive fibers, i.e., the non-carbonized fibers, may also be rayon fibers of a length in a range of about 700 to 900 micrometers. These fibers are mixed with the carbon fibers in concentrations in the range of about zero up to 50 weight percent based on the total weight of the fibers in the aqueous mixture. These fibers are in turn combined with the carbonizable binder and water to form an aqueous solution which contains about 100 to 500 ppm of solids material.

The binder utilized in the present invention is preferably formed of high carbon yield thermosetting resin such as a phenolic, polyamide, or polyimide resin in a particulate uncured form. This resin precursor when cured and then carbonized joins together the various fibers to form a self-supporting fibrous composite. The concentration of the binder particulates is in a range of about 25 to 50 weight percent of the solids in the aqueous solution. The resin precursors may be readily cured by heating in air at a temperature in the range of about 100° C. to 130° C. Carbonization of the resin and fugitive fibers may be achieved by heating the molded composite in argon or the like to a temperature in the range of about 750° C. to 950° C.

In a demonstration of the method of the present invention, three types of fibrous billets were fabricated with discoidal configurations of a diameter of 28 centimeters and with thicknesses in the range of 2 to 6 centimeters. The first billet formed was formed from an aqueous slurry containing 320 grams of carbonized fibers, 160 grams of the phenol formaldihyde resin precurser, and no fugitive organic fibers. The second billet was formed from an aqueous slurry containing 180 grams of carbon fibers, 90 grams of the resin precursor and 180 grams of the organic or fugitive binders. The third billet was formed of 80 grams of the carbon fibers, 80 grams of the resin binder and 320 grams of the fugitive fibers.

Each billet was fabricated by molding the aqueous slurry containing the particular solid mixtures in a molding tank arrangement as briefly described above. The slurry tank 10 was equipped with a stirrer 12 for blending ingredients of the slurry 14. A perforated mandrel 22 was placed over the drain 18 in the molding tank 16 and the mandrel 22 covered with a filter cloth. An adjustable valve 24 was then interconnected with the drain pipe 26 from the molding tank 16 to control the flow rate of the water being drained from the molding tank 16. This flow rate was calibrated and established by timing the drop in the water level within the molding tank 16 for a measured distance on the wall of the tank. Each of the aforementioned three billets was then fabricated by employing the same procedures which involved the the mixing each of the aforementioned billet compositions with 125 liters of water in the slurry tank 10 for a period of 15 minutes. Each aqueous slurry 14 was then conveyed to the molding tank 16 where the solids material from the aqueous slurry was deposited on the filter-cloth covered mandrel 22 as the water was drained at a controlled rate from the molding tank 16 through the mandrel 22. In molding the three billets, the first billet was molded with a flow rate of 0.26 liters of water per minute per square inch of mandrel surface area, the second billet with a flow rate of 0.13 liters per minute per square inch of mandrel surface area, and the third billet was molded with a flow rate of 0.06 liters of water per minute per square inch of mandrel surface area. After the water was removed from the molding tank 16 each billet was removed from the tank 16, heated to a temperature of about 110°–120° C. for a duration of about 16–20 hours to cure the binder particulates and then removed from the mandrel. Each billet was then heated in an inert atmosphere of argon to a temperature of 800° C. for about 1 hour for carbonizing the carbonizable materials in the billet. The densities of each carbonized composite was then determined by removing a sample from the composite and measuring the dimensions of the sample and weighing the sample.

As a result of this molding procedure the carbonized composite containing no fugitive fibers had an average density of 0.053 g/cc when molded without using vacuum assistance for removing the water from the molding tank 16. This density is significantly lower than the densities of about 0.15 to 0.25 g/cc of composites with the same ingredients when the vacuum assistance was used for draining the water from the molding tank 16. The carbonized composite containing the 67 weight percent of fugitive fibers (160 grams) had an average density 0.052 g/cc when molded at a flow rate of 0.26 liters of water per minute per square inch of mandrel surface. Decreasing this flow rate to 0.06 liter per minute per square inch of mandrel surface for a similar composition containing 67 weight percent fugitive fibers resulted in a composite having a density of 0.0613 g/cc. The carbonized composite containing 60 grams or 40 weight percent of fugitive fibers had average density of 0.045 grams per cubic centimeter and was molded at a rate of 0.13 liter of water per minute per square inch of mandrel surface.

It was also found that with increasing concentrations of the fugitive fibers in the composite results in further reductions in the density of the composites due to the weight loss encountered during the carbonization of the fugitive fibers. However, the use of fugitive fibers can only provide a limited amount of reduction in density without detracting from the structural integrity of the composite. Thus, the addition of fugitive fibers up to about 50 weight percent of the total weight of the composite can assist in reducing the composite densities in the range of 0.0505–0.0521 grams per cubic centimeters to densities in the range of about 0.0432–0.0462 grams per cubic centimeter. However, fugitive fibers in amounts greater than about 50 weight percent cause an increase in a composite density. Also, the structural integrity of such composites become impaired due to the excessive shrinkage and collapsing of the composite structure during carbonization.

Another advantage obtained by employing a method of the present invention is that the gravitational flow molding process lays down the fibers in such an orientation that they are predominately parallel with the surface of the mandrel so as to provide an unusually high degree of elastic tolerance to applied strains. Yield point under compressive loading is 70% deflection. Compressive failure occurs at 95% deflection. Yield point under tensile loading is 20% deflection. Tensile failure occurs at 27% deflection. On the other hand, these composites are relatively stiff in the direction perpendicular to the molding direction.

It will be seen that the method of the present invention is capable of providing ultralight carbon fiber composites which can be satisfactorily used as thermal insulation in aerospace applications where weight restrictions are significant. Also, the elastic tolerance provided by the composites of the present invention also enables the composites to be employed as light duty load level spring or dampening pads for systems or equipment operating in vacuum for long durations such as encountered in aerospace applications. The material can support 150 pounds per square foot in compression, within its elastic range, and can be cycled with this load to 60% deflection for more than one million cycles.

We claim:

1. Method of fabricating a carbon-bonded carbon fiber composite of a density in a range of about 0.04 to 0.10 grams per cubic centimeter, comprising the steps of forming an aqueous slurry containing about 100 to 500 ppm of solid material consisting essentially of carbonaceous fibers and a carbonizable binder provided by a corable thermosetting resin precursor, contacting a surface of a perforated and configured mandrel with the aqueous slurry, depositing solid material from the aqueous slurry onto the surface of the mandrel by draining water from the aqueous slurry through perforations in the mandrel with gravity flow at a flow rate in the range of 0.03 to 0.30 liters of water per minute per square inch of surface area on said mandrel contacted by said aqueous slurry, continuing the deposition of the solid material onto said mandrel until a billet of the solid material of a desired thickness is formed, heating the billet for curing the resin precursor, removing the molded billet from the mandrel, and thereafter heating the billet in an inert atmosphere to a temperature sufficient to carbonize carbonizable material in said billet for providing said carbon-bonded, carbon fiber composite.

2. The method of fabricating a carbon-bonded carbon fiber composite as claimed in claim 1, wherein the carbonaceous fibers are provided by carbon fibers and organic carbonizable fibers with said organic carbonizable fibers being in a concentration of about 0 to 50 weight percent of the solid material in said aqueous slurry.

3. A method of fabricating a carbon-bonded carbon fiber composite as claimed in claim 2, wherein the resin is a phenolic, polyamide or polyimide resin.

4. A method of fabricating a carbon-bonded carbon fiber composite as claimed in claim 2, wherein the carbonaceous fibers provide about 50 to 75 weight percent of the solid material in the aqueous slurry.

5. A method of fabricating a carbon-bonded carbon fiber composite as claimed in claim 1, wherein the steps of heating the billet for curing a curable thermosetting resin precursor is achieved at a temperature in the range of about 90° C. to 130° C. for a duration of about 16 to 20 hours and wherein the step of heating the billet in an inert atmosphere to carbonize the carbonizable material is provided in an atmosphere of argon at a temperature of about 750° C. to 950° C. for a duration of at least one hour.

* * * * *